United States Patent
Katsuda

[11] Patent Number: 5,979,885
[45] Date of Patent: Nov. 9, 1999

[54] DAMPING COEFFICIENT CONTROL APPARATUS FOR DAMPING MECHANISM IN VEHICLE SUSPENSION SYSTEM

[75] Inventor: Takayuki Katsuda, Okazaki, Japan

[73] Assignee: Toyota Jidosha Kabushiki Kaisha, Toyota, Japan

[21] Appl. No.: 08/953,462

[22] Filed: Oct. 17, 1997

[30] Foreign Application Priority Data

Oct. 18, 1996 [JP] Japan .................................. 8-276505

[51] Int. Cl.⁶ ............................................. F16F 5/00
[52] U.S. Cl. ...................... 267/140.14; 188/266.1; 280/5.515; 280/5.519; 701/37
[58] Field of Search .............. 267/136, 140.14; 188/266.1, 266.2, 266.3, 266.4, 266.5, 378, 379, 380; 280/5.515, 5.519; 701/37

[56] References Cited

U.S. PATENT DOCUMENTS

| 5,521,821 | 5/1996 | Shimizu et al. | 280/5.515 |
| 5,701,245 | 12/1997 | Ogawa et al. | 280/5.515 |

FOREIGN PATENT DOCUMENTS

| 61-166711 | 7/1986 | Japan . |
| 62-103215 | 5/1987 | Japan . |
| 2-18109 | 1/1990 | Japan . |
| 5-294122 | 11/1993 | Japan . |

*Primary Examiner*—Robert J. Oberleitner
*Assistant Examiner*—Mariano Sy
*Attorney, Agent, or Firm*—Kenyon & Kenyon

[57] ABSTRACT

A damping coefficient control apparatus for a damper device in a suspension mechanism disposed between a sprung mass and an unsprung mass of a wheeled vehicle, wherein an absolute vertical movement velocity of the sprung mass is detected in an absolute space to adjust a damping coefficient of the damper device to a predetermined small value when vertical vibration of the sprung mass tends to be increased and to increase the damping coefficient of the damper device more than the predetermined small value in accordance with an increase of the absolute vertical movement velocity when vertical vibration of the sprung mass tends to be dampened, and wherein the magnitude of vertical vibration of the sprung mass is further detected to adjust a lower limit value of the damping coefficient of the damper device to a larger value than the predetermined small value when the magnitude of vertical vibration of the sprung mass increases.

7 Claims, 8 Drawing Sheets

DAMPING COEFFICIENT CONTROL APPARATUS FOR DAMPING MECHANISM IN VEHICLE SUSPENSION SYSTEM

BACKGROUND OF THE INVENTION

1. Field of the Invention

The present invention relates to a damping coefficient control apparatus for a damper device in a suspension mechanism disposed between a sprung mass and an unsprung mass of a wheeled vehicle.

2. Description of the Prior Art

Disclosed in Japanese Patent Laid-open Publication No. 5(1993)-294122 is a control apparatus for controlling a damping coefficient of a damper device in a vehicle suspension mechanism on a basis of Skyhook theory. In the control apparatus, an absolute vertical movement velocity of a sprung mass of a wheeled vehicle and a relative vertical movement velocity of the sprung mass to an unsprung mass of the vehicle are detected to decrease the damping coefficient of the damper device when the absolute vertical movement velocity and relative vertical movement velocity are different in their movement directions and to increase the damping coefficient of the damper device in accordance with an increase of a ratio of the absolute vertical movement velocity to the relative vertical movement velocity when the absolute vertical movement velocity and relative vertical movement velocity coincide in their movement directions.

In such control of the damping coefficient based on the Skyhook theory, it is premised that there is not any restriction in the relative vertical displacement amount of the sprung mass to the unsprung mass. In an actual damper device in the suspension mechanism, however, a rebound stopper is assembled with the piston rod of the damper device to avoid the piston in the damper device from abutment against the internal upper end of a cylinder tube, and a bound stopper is mounted to the vehicle body structure to avoid the cylinder tube against the vehicle body structure. On the other hand, when vertical vibration of the sprung mass is in a vibration region under control based on the Skyhook theory, the damping coefficient of the damper device is maintained in a small value to permit free displacement of the sprung mass relative to the unsprung mass. As a result, when the road wheels of the vehicle fall in a recessed portion on a travel road or ride over a projection on the travel road, free displacement of the sprung mass causes the rebound stopper to abut against the internal upper end of the cylinder tube or the bound stopper to abut against the head portion of the cylinder tube. Although in such an instance, the rebound stopper or bound stopper acts to absorb a great impact acting on the cylinder tube, there occur unpleasant noise and shock.

SUMMARY OF THE INVENTION

It is, therefore, a primary object of the present invention to provide a control apparatus for a damper device in a vehicle suspension mechanism capable of controlling a damping coefficient of the damper device based on the Skyhook theory without casing abutment of the rebound stopper or bound stopper discussed above.

According to the present invention, the object is accomplished by providing a damping coefficient control apparatus for a damper device in a suspension mechanism disposed between a sprung mass and an unsprung mass of a wheeled vehicle, which comprises first detection means for detecting an absolute vertical movement velocity of the sprung mass in an absolute space and control means for adjusting a damping coefficient of the damper device to a predetermined small value when vertical vibration of the sprung mass tends to be increased and for increasing the damping coefficient of the damper device more than the predetermined small value in accordance with an increase of the absolute vertical movement velocity detected by the first detection means when vertical vibration of the sprung mass tends to be dampened, wherein the damping coefficient control apparatus further comprises second detection means for detecting the magnitude of vertical vibration of the sprung mass and adjustment means for adjusting a lower limit value of the damping coefficient of the damper device to a larger value than the predetermined small value when the magnitude of vertical vibration of the sprung mass increases.

According to an aspect of the present invention, there is provided a damping coefficient control apparatus for a damper device in a suspension mechanism disposed between a sprung mass and an unsprung mass of a wheeled vehicle, which comprises first detection means for detecting an absolute vertical movement velocity of the sprung mass in an absolute space, second detection means for detecting a relative vertical movement velocity of the sprung mass to the unsprung mass, means for determining a target damping coefficient in a predetermined small value when the absolute vertical movement velocity and relative vertical movement velocity are different in their movement directions and for increasing the target damping coefficient in accordance with an increase of a velocity ratio of the absolute vertical movement velocity to the relative vertical movement velocity when the absolute vertical movement velocity and relative vertical movement velocity coincide in their movement directions, and control means for controlling the damping coefficient of the damper device to the target damping coefficient, wherein the damping coefficient control apparatus further comprises third detection means for detecting the magnitude of vertical vibration of the sprung mass and adjustment means for adjusting a lower limit value of the target damping coefficient to a larger value than the predetermined small value when the magnitude of vertical vibration of the sprung mass becomes large.

According to another aspect of the present invention, there is provided a damping coefficient control apparatus for a damper device in a suspension mechanism disposed between a sprung mass and an unsprung mass of a wheeled vehicle, which comprises first detection means for detecting an absolute vertical movement velocity of the sprung mass in an absolute space and control means for adjusting a damping coefficient of the damper device to a predetermined small value when vertical vibration of the sprung mass tends to be increased and for increasing the damping coefficient of the damper device more than the predetermined small value in accordance with an increase of the absolute vertical movement velocity when vertical vibration of the sprung mass tends to be dampened, wherein the damping coefficient control apparatus further comprises second detection means for detecting a relative vertical displacement amount of the sprung mass to the unsprung mass and adjustment means for adjusting a lower limit value of the damping coefficient of the damper device to a larger value than the predetermined small value when the relative vertical displacement amount detected by the second detection means is out of a predetermined range.

According to a further aspect of the present invention, there is provided a damping coefficient control apparatus for a damper device in a suspension mechanism disposed between a sprung mass and an unsprung mass of a wheeled vehicle, which comprises first detection means for detecting an absolute vertical movement velocity of the sprung mass in an absolute space, second detection means for detecting a relative vertical movement velocity of the sprung mass to the unsprung mass, means for determining a target damping coefficient in a predetermined small value when the absolute vertical movement velocity and relative vertical movement velocity are different in their movement directions and for increasing the target damping coefficient in accordance with a velocity ratio of the absolute vertical movement velocity to the relative vertical movement velocity when the absolute vertical movement velocity and relative vertical movement velocity coincide in their movement directions, and control means for controlling the damping coefficient of the damper device to the target damping coefficient, wherein the damping coefficient control apparatus further comprises third detection means for detecting a relative vertical displacement amount of the sprung mass to the unsprung mass and adjustment means for adjusting a lower limit value of the target damping coefficient to a larger value than the predetermined small value when the relative vertical displacement amount detected by the third detection means is out of a predetermined range.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENT

Figure 1:
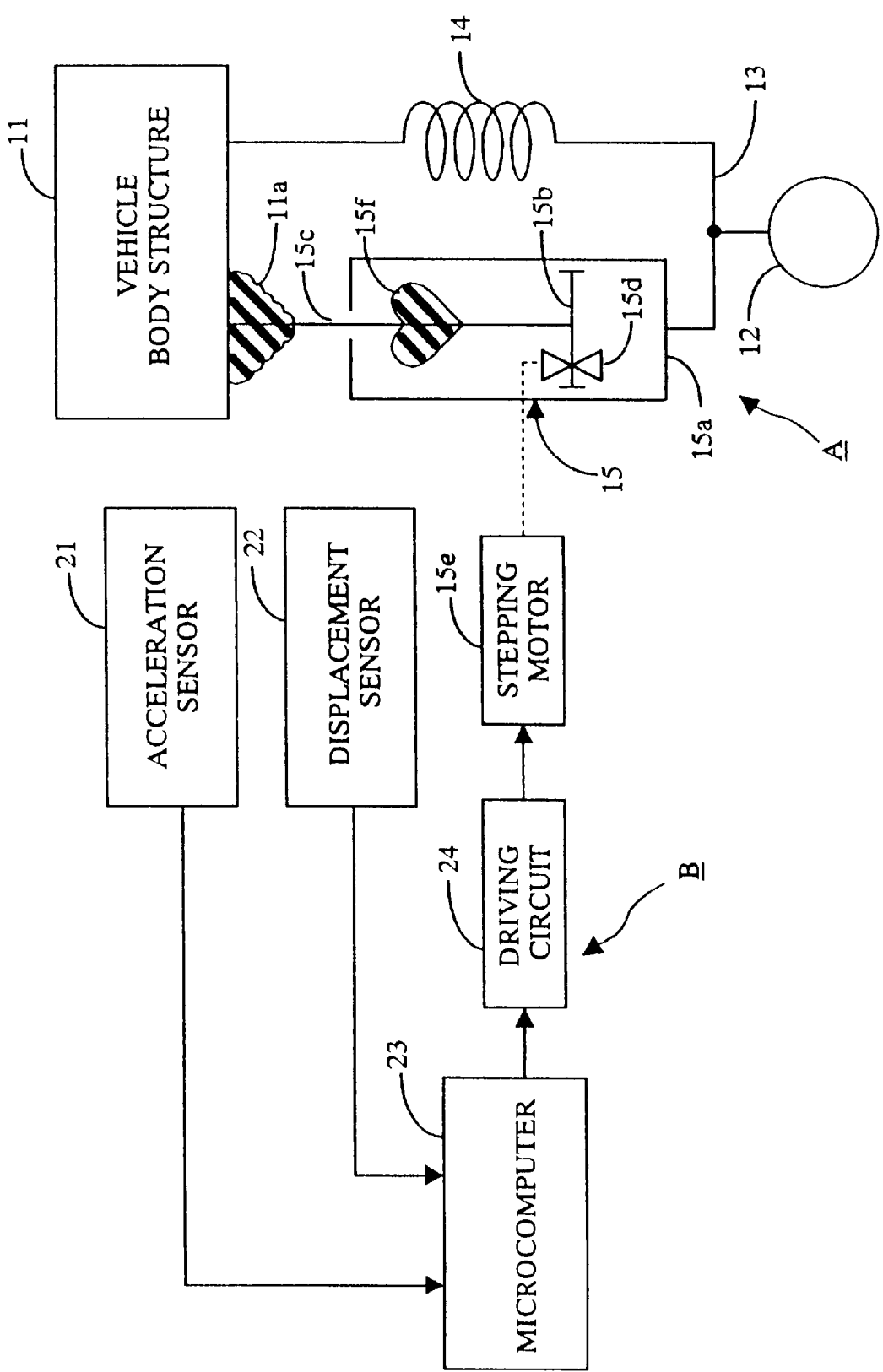
FIG. 1 is an electric control apparatus for a suspension mechanism of a wheeled vehicle.

In FIG. 1 of the drawings, there is schematically illustrated an electric control apparatus B for a suspension mechanism A of a wheeled vehicle. The suspension mechanism A includes a coil spring 14 and a hydraulic damper device 15 disposed in parallel between a body structure 11 (a sprung mass) of the vehicle and a lower arm member 13 connected to the body structure 11 at its inner end for supporting a road wheel 12 (an unsprung mass) at its outer end. The vehicle body structure is resiliently suspended by the coil spring 14 on the lower arm member 13. The hydraulic damper device 15 is composed of a cylinder tube 15a filled with an amount of hydraulic fluid and mounted on the lower arm member 13, a piston 15b slidably disposed in the cylinder tube 15a and a piston rod 15c connected at its lower to the piston 15b and at its upper end to the vehicle body structure. The hydraulic damper device 15 is expanded and contracted to produce a damping force in proportion to a relative vertical movement velocity of the vehicle body structure to the lower arm member 13 and to produce a damping force for restraining vertical vibration of the vehicle body structure relative to the road wheel 12.

In the hydraulic damper device 15, the piston 15b is provided with a variable orifice 15d for fluid communication between upper and lower fluid chambers formed by the piston 15b in the cylinder tube 15a. The opening degree of variable orifice 15d is adjusted by an actuator in the form of a stepping motor 15e which is mounted on the vehicle body structure to control the damping coefficient of the damper device 15. The piston rod 15c is provided with a rebound stopper 15f of elastic material such as synthetic rubber fixed thereto for resiliently restricting upward displacement of the vehicle body structure 11 by abutment against the internal upper end of cylinder tube 15a when the damper device 15 is expanded in a large amount. A bound stopper 11a of elastic material such as synthetic rubber is fixed to a bottom surface of the vehicle body structure 11 for resiliently restricting downward displacement of the vehicle body structure 11 by abutment against the head portion of cylinder tube 15a when the damper device 15 is contracted in a large amount.

The electric control apparatus B includes a microcomputer 23 connected at its input side to an acceleration sensor 21 and a displacement sensor 22 and at its output side to a driving circuit 24. The acceleration sensor 21 is mounted on the vehicle body structure 11 to detect absolute vertical acceleration x" of the vehicle body structure 11 in an absolute space for producing a detection signal indicative of the detected absolute vertical acceleration x". Upward acceleration of the vehicle body structure 11 is represented by a positive value of the vertical acceleration x", and downward acceleration of the vehicle body structure 11 is represented by a negative value of the vertical acceleration x". The displacement sensor 22 is disposed between the vehicle body structure 11 and the lower arm member 13 to detect a relative vertical displacement amount y of the vehicle body structure 11 to the road wheel 12 for producing a detection signal indicative of the detected relative vertical displacement amount y. An expanded amount of the damper device 15 is represented by a positive value of the relative vertical displacement amount y, and a contracted amount of the damper device 15 is represented by a negative value of the relative vertical displacement amount y.

Figure 2:
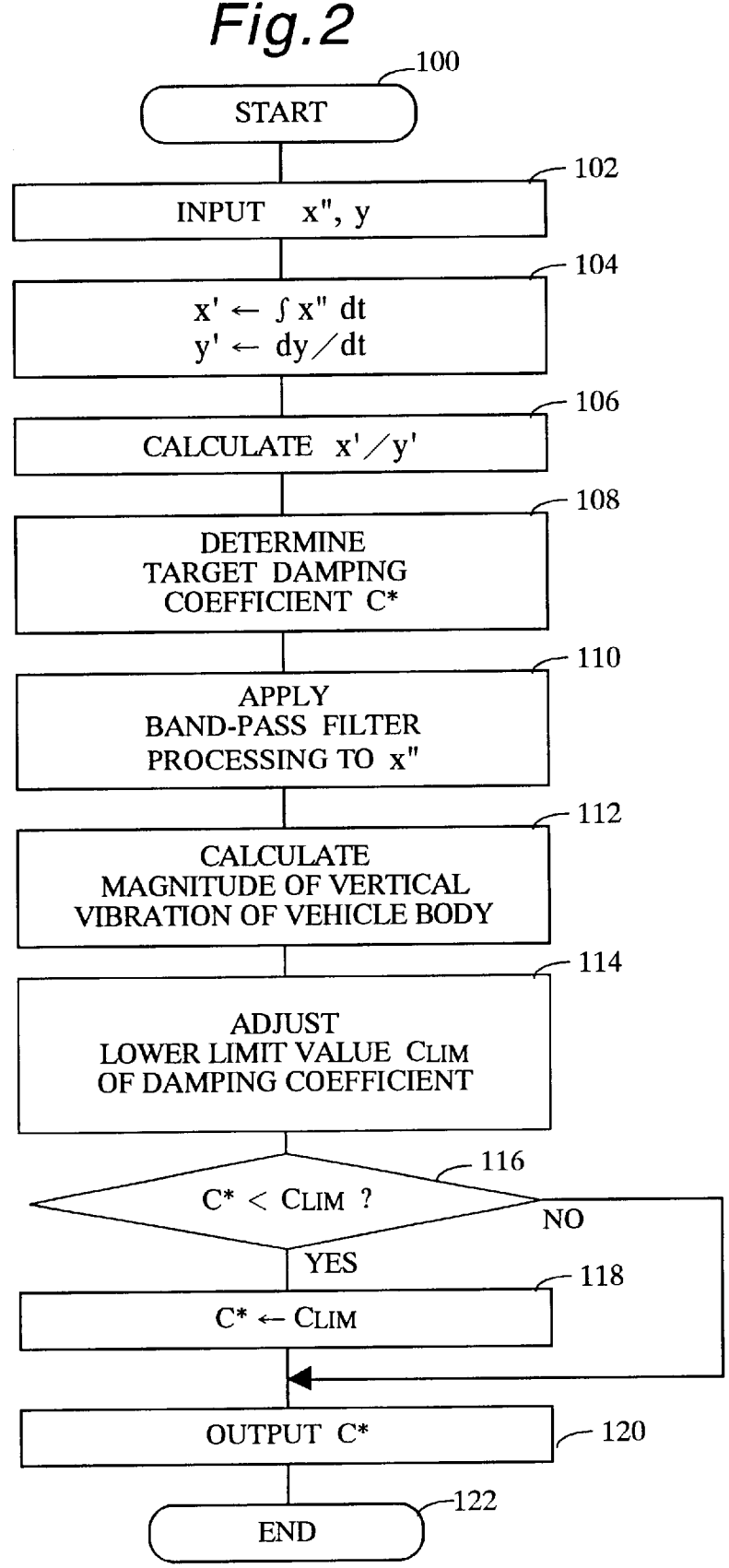
FIG. 2 is a flow chart of a control program executed by a microcomputer in a first embodiment of the present invention.

The microcomputer 23 is programmed to repeat execution of a control program shown by a flow chart in FIG. 2 upon each lapse of a predetermined short time under control of a timer contained therein for determining a target damping coefficient C* and for applying a control signal indicative of the target damping coefficient C* to the driving circuit 24. When applied with the control signal, the driving circuit 24 activates the stepping motor 15e to adjust the opening degree of variable orifice 15d for setting the damping coefficient of damper device 15 to the target damping coefficient C*.

Figure 3:
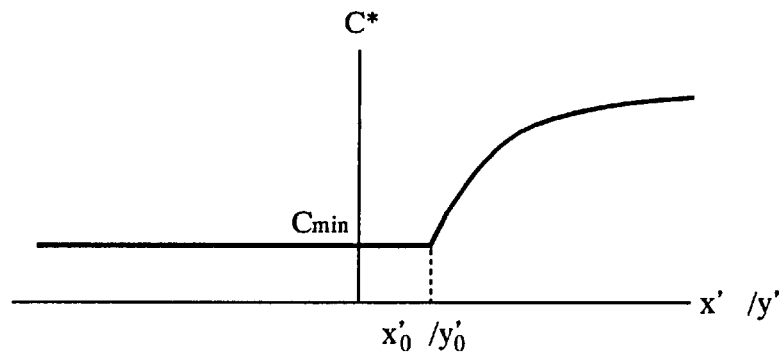
FIG. 3 is a graph showing a target coefficient C* in relation to a velocity ratio x'/y' utilized for execution of the control program.

In operation of the electric control apparatus, the computer 23 starts execution of the control program at step 100 in FIG. 2 and reads out at step 102 a vertical acceleration data x" and a vertical displacement amount data y detected by sensors 21 and 22. At the following step 104, the computer 23 calculates an absolute vertical movement velocity x' of the vehicle body structure 11 by time integration of the vertical acceleration data x" and calculates a relative vertical movement velocity y' of the vehicle body structure 11 to the road wheel 12 by time differentiation of the vertical displacement amount data y. Subsequently, the computer 23 calculates at step 106 a velocity ratio x'/y' of the absolute vertical movement velocity x' relative to the relative vertical movement velocity y' and determines at step 108 a target damping coefficient C* in accordance with the velocity ratio x'/y' with reference to a target coefficient table contained therein. As shown in FIG. 3, the target damping coefficient table is stored in the computer 23 to determine the target damping coefficient C* to a predetermined positive small value Cmin when the velocity ratio x'/y' is a negative value or less than a predetermined positive small value $x'_0/y'_0$ and to increase the target damping coefficient C* in accordance with an increase of the velocity ratio x'/y' more than the predetermined positive small value $X'_0/y'_0$. Accordingly, as shown in FIG. 6, the target damping coefficient C* is rapidly increased and gradually decreased step by step when the absolute vertical movement velocity x' and relative vertical movement velocity y' are identical in their signs in the same direction and is maintained in the predetermined small value Cmin when the absolute vertical movement velocity x' and relative vertical movement velocity y' are different in their signs and directions.

Figure 4:
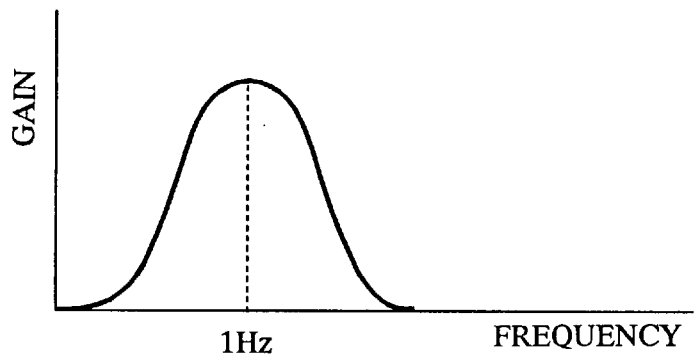
FIG. 4 is a graph showing a gain in relation to a frequency of a band-pass filter.
Figure 5:
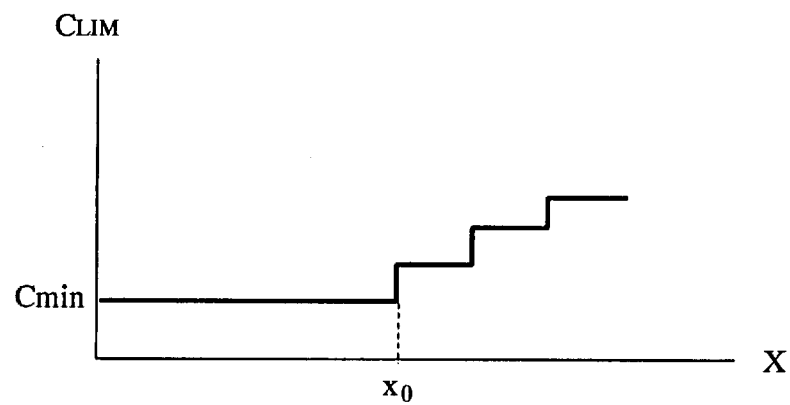
FIG. 5 is a graph showing a lower limit value $C_{LIM}$ of a damping coefficient in relation to the magnitude of vertical vibration of a sprung mass of the vehicle.

After determination of the target damping coefficient C*, the computer 23 applies at step 110 band-pass filter processing shown in FIG. 4 to the absolute vertical acceleration x" and calculates at step 112 an absolute value of the vertical acceleration x" applied with the band-pass filter processing and applies integration processing or low-pass filter processing to the absolute value of the vertical acceleration x" to calculate the magnitude X of vertical vibration of the vehicle body structure 11 approximately at a resonant frequency of the same. After calculation of the magnitude X of vertical vibration of the vehicle body structure, the computer 23 determines at step 114 a lower limit value $C_{LIM}$ of the damping coefficient in accordance with the magnitude X of vertical vibration of the vehicle body structure with reference to an adjustment table shown in FIG. 5. The adjustment table is stored in the computer 23 to gradually increase the lower limit value $C_{LIM}$ of the damping coefficient of damper device 15 more than the predetermined small value Cmin in accordance with an increase of the magnitude X of vertical vibration of the vehicle body structure.

After determination of the lower limitation value $C_{LIM}$, the computer 23 executes processing at step 116 and 118 to adjust the target damping coefficient C* to the lower limit value $C_{LIM}$. In this instance, if the target damping coefficient C* is less than the lower limit value $C_{LIM}$, the computer 23 determines a "Yes" answer at step 116 and adjusts the target damping coefficient C* to the lower limit value $C_{LIM}$. As a result, the target damping coefficient C* is defined as shown by hatched portions in FIG. 6. If the answer at step 116 is "?No", the computer 23 applies at step 120 a control signal indicative of the target damping coefficient C* to the driving circuit 24 and finishes execution of the control program at step 122. Thus, the driving circuit 24 activates the stepping motor 15e in response to the control signal to set the damping coefficient of damper device 15 to the target damping coefficient C*. Thereafter, the computer 23 resumes execution of the control program upon lapse of the predetermined short time to apply a control signal indicative of a target damping coefficient C* newly determined at step 108 to the driving circuit 24 for setting the damping coefficient of damper device 15 to the newly determined target damping coefficient C*.

Figure 6:
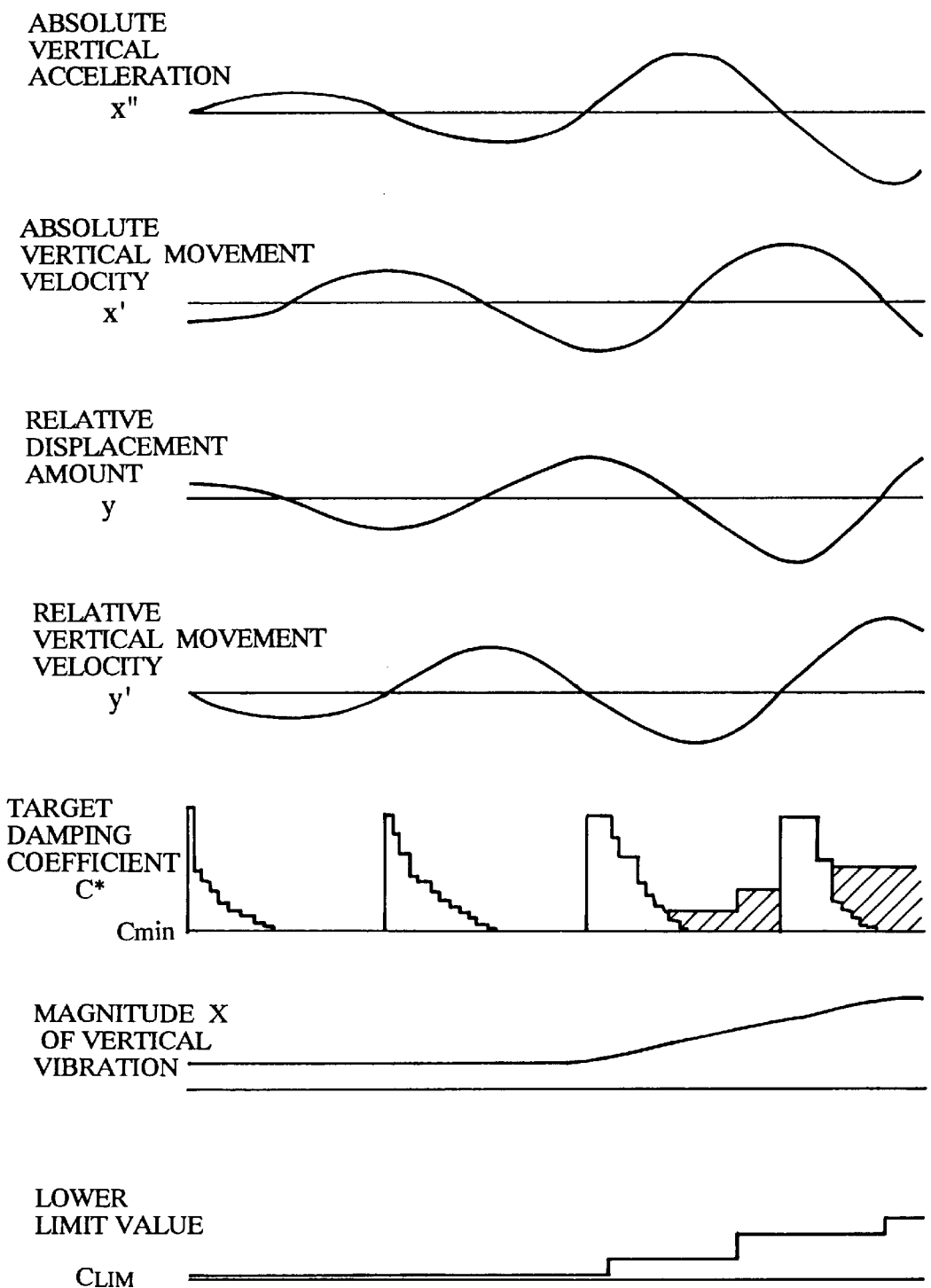
FIG. 6 is a time chart illustrating a changing condition of absolute vertical acceleration x", absolute vertical movement velocity x', a relative displacement amount y, relative vertical movement velocity y', the target damping coefficient C*, the magnitude X of vertical vibration and the lower limit value $C_{LIM}$ of the damping coefficient.

From the above description, it will be understood that when the magnitude X of vertical vibration of the vehicle body structure is small, the lower limit value $C_{LIM}$ determined by processing at step 114 is maintained in the predetermined small value Cmin so that the target damping coefficient C* is adjusted to each value determined by processing at step 108, as shown in FIG. 6. In such an instance, vertical vibration of the vehicle body structure is restrained on a basis of the Skyhook theory. When the magnitude X of vertical vibration of the vehicle body structure increases, the lower limit value $C_{LIM}$ determined by processing at step 114 is adjusted step by step to a larger value than the predetermined small value Cmin so that the target damping coefficient C* is adjusted to a larger value than the predetermined small value Cmin as shown in FIG. 6. In such an instance, the damping coefficient of damper device 15 is set to the larger value than the lower limit value $C_{LIM}$ to restrain vertical vibration of the vehicle body structure by a relatively large damping force. This is effective to prevent the rebound stopper 15f from abutment against the internal upper end of cylinder tube 15a and to prevent the bound stopper 11a from abutment against the head portion of cylinder tube 15a. As a result, even if the vehicle body structure is vibrated in a large displacement amount, the occurrence of unpleasant noise is eliminated to enhance riding comfort of the vehicle.

Although in the above embodiment, the lower limit value $C_{LIM}$ is gradually increased step by step in accordance with an increase of the magnitude X of vertical vibration of the vehicle body structure, the lower limit value $C_{LIM}$ may be increased by a predetermined value when the magnitude of vertical vibration of the vehicle body structure exceeds a predetermined value. In such a case, the magnitude of vertical vibration is compared with the predetermined value by processing at step 114 to set the lower limit value $C_{LIM}$ to the predetermined small value Cmin when the magnitude of vertical vibration is less than the predetermined value and to adjust the lower limit value $C_{LIM}$ to a larger value than the predetermined small value Cmin when the magnitude of vertical vibration increases more than the predetermined value.

Although in the above embodiment, the magnitude X of vertical vibration of the vehicle body structure is calculated by processing at step 110 and 112 on a basis of the absolute vertical acceleration x" detected by sensor 21, the magnitude X of vertical vibration may be directly detected by a vibration sensor mounted on the vehicle body structure or calculated in a different manner from the calculation based on the absolute vertical acceleration x".

Figure 7:
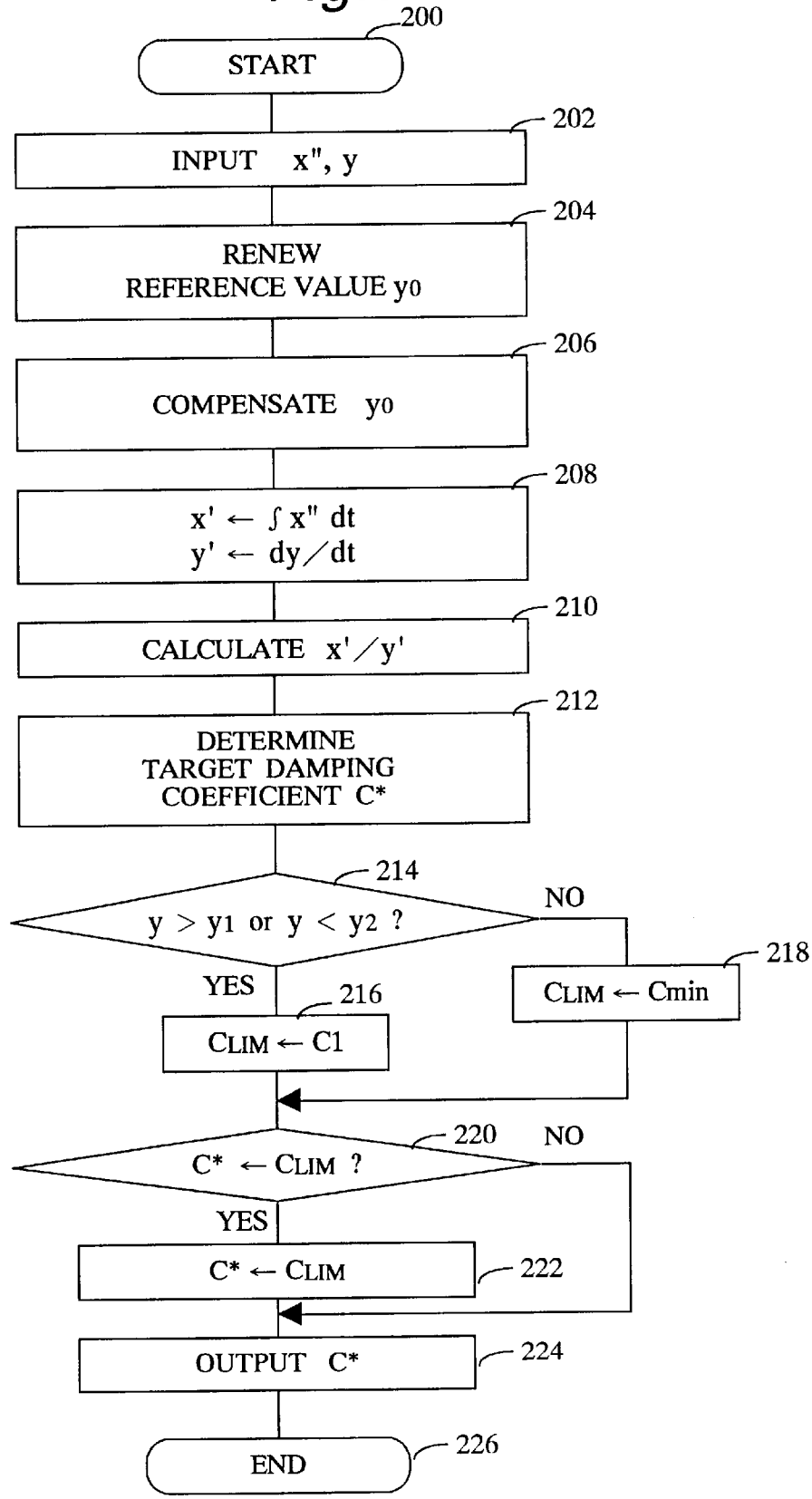
FIG. 7 is a flow chart of a control program executed by the microcomputer in a second embodiment of the present invention.

Illustrated in FIG. 7 is a modification of the control program shown in FIG. 2. In this modification, the computer 23 starts execution of the program at step 200 and reads out at step 202 absolute vertical acceleration x" and a relative vertical displacement amount y of the vehicle body structure to the lower arm member 13 detected by sensors 21 and 22 in the same manner as in the above embodiment. At the following step 204, the computer 23 renews a reference value y0 of the relative vertical displacement amount y to adjust the reference value y0 respectively in slight positive and negative amounts in accordance with change of the loaded weight of the vehicle. The processing at step 204 is executed to continuously integrate the relative vertical displacement amount y for a long time thereby to continuously renew the reference value y0 based on the integrated displacement amount. After renewal of the reference value y0, the computer 23 compensates at step 206 the relative vertical displacement amount y using the reference value y0. This causes the relative vertical displacement amount y to represent a relative vertical displacement amount of the vehicle body structure 11 to the lower arm member 13 irrespectively of change of the reference value y0.

After processing at step 206, the computer 23 calculates an absolute vertical movement velocity x', a relative vertical movement velocity y' and a velocity ratio x'/y' by processing at step 208 and 210 in the same manner as in the processing at step 104 and 106 shown in FIG. 2 and determines a target damping coefficient C* by processing at step 212 in the same manner as in the processing at step 108 shown in FIG. 2. Subsequently, the computer 23 determines at step 214 whether the compensated relative vertical displacement amount y is in a range between predetermined positive and negative values y1 and y2 or not. If the answer at step 214 is "Yes", the computer 23 sets at step 216 a larger value C* than the predetermined small value Cmin of the damping coefficient as the lower limit value $C_{LIM}$. If the answer at step 214 is "No", the computer 23 sets at step 218 the predetermined small value Cmin of the damping coefficient as the lower limit value $C_{LIM}$. After processing at step 216 or 218, the computer 23 executes processing at step 220 to 224 in the same manner as in the processing at step 116 to 120 shown in FIG. 2 to adjust the target damping coefficient C* to the lower limit value $C_{LIM}$ for controlling the damping coefficient of damper device 15 to the target damping coefficient C*. Accordingly, when the absolute value of the relative vertical displacement amount of the vehicle body structure to the road wheel 12 is small in the range between the predetermined positive and negative values y1 and y2, the lower limit value $C_{LIM}$ is maintained in the predetermined small value Cmin to control the damping coefficient of damper device 15 to the target damping coefficient determined by processing at step 108 thereby to restrain vertical vibration of the vehicle body structure on a basis of the Skyhook theory.

Figure 8:
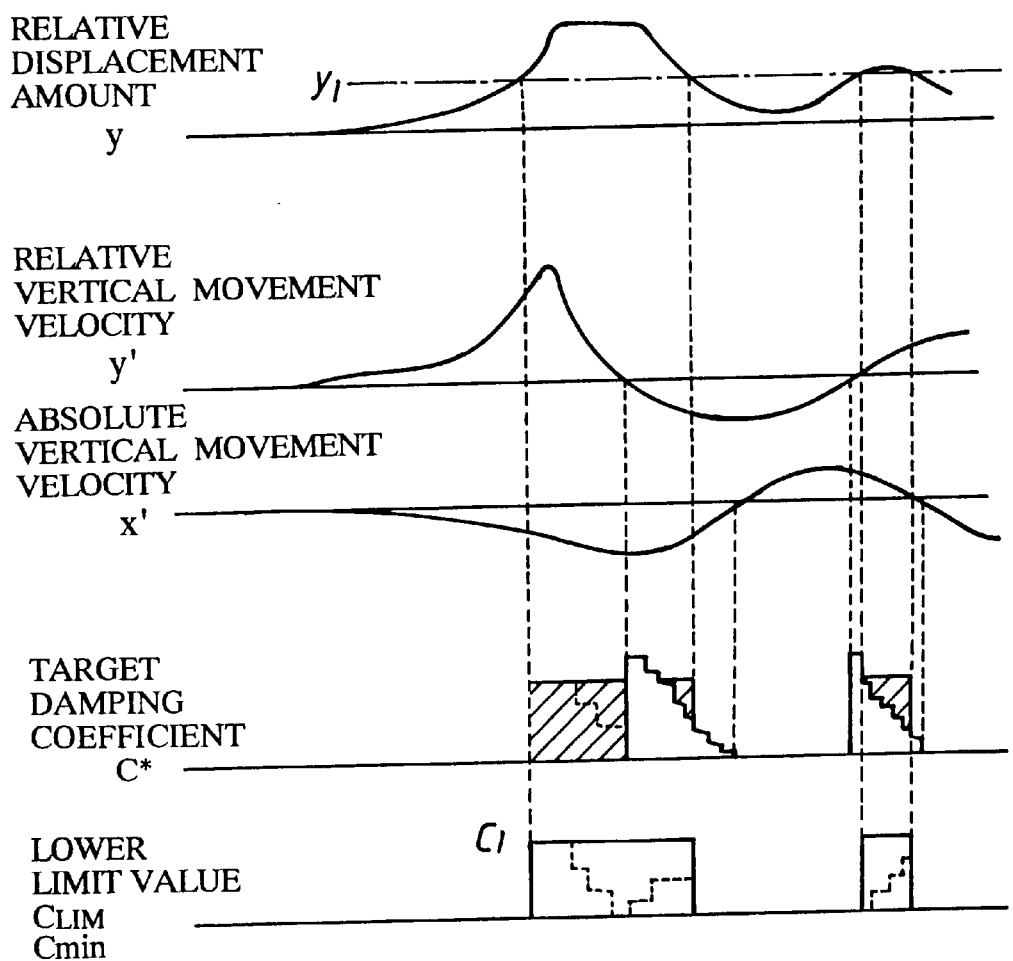
FIG. 8 is a time chart illustrating a changing condition of the relative vertical displacement amount y, relative vertical movement velocity y', absolute vertical movement velocity x', target damping coefficient C* and lower limit value $C_{LIM}$ of the damping coefficient.

When the road wheel 12 falls into a recessed portion on the travel road of the vehicle, the damper device 15 is expanded to increase the relative vertical displacement amount y of the vehicle body structure to the road wheel 12 more than the predetermined positive value y1. In such an instance, the lower limit value $C_{LIM}$ is set to the larger value C1 than the predetermined small value Cmin by processing at step 214 and 216 so that the target damping coefficient C* is adjusted to the larger value C1 than the predetermined small value Cmin by processing at step 220 and 222. As a result, even if vertical vibration of the vehicle body structure is in a vibration region or the target damping coefficient C* is determined in a small value by processing at step 212, the damping coefficient of damper device 15 is adjusted to the larger value C1 as shown by a hatched portion in FIG. 8 to restrain downward or upward movement of the road wheel 12 relative to the vehicle body structure thereby to avoid the rebound stopper 15f from abutment against the internal upper end of cylinder tube 15a.

When the road wheel 12 rides over a projection on the travel road of the vehicle, the damper device 15 is contracted to decrease the relative vertical displacement amount y to the road wheel 12 less than the predetermined negative value y1. In such an instance, the lower limit value $C_{LIM}$ is set to the larger value C1 than the predetermined small value Cmin by processing at step 214 and 216 so that the target damping coefficient C* is adjusted to the larger value C1 than the predetermined small value Cmin by processing at step 220 to 224. As a result, the damping coefficient of damper device 15 is set to the larger value C1 as shown by a hatched portion in FIG. 8 to avoid the bound stopper 11a from abutment against the head portion of cylinder tube 15a and to eliminate the occurrence of unpleasant noise even when the absolute value of the relative vertical displacement amount of the vehicle body structure becomes large.

Figure 9:
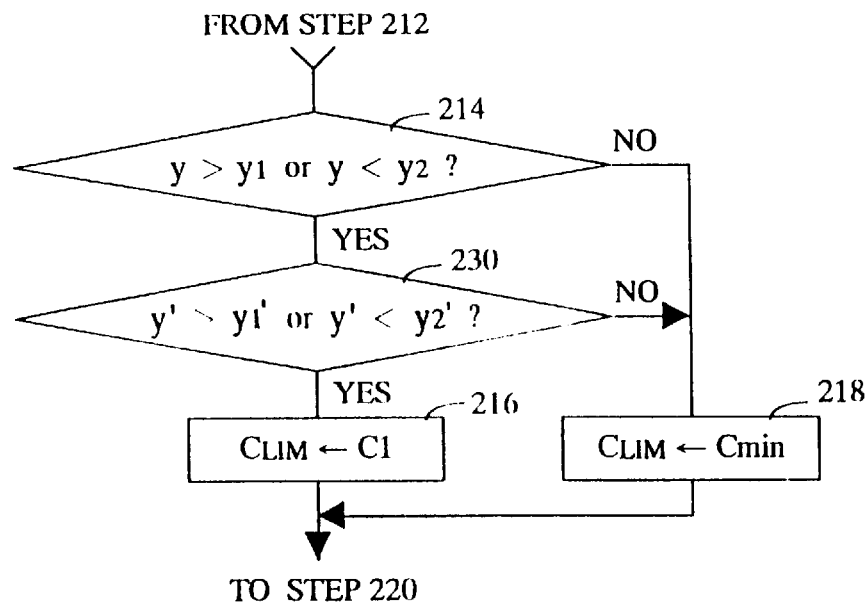
FIG. 9 is a flow chart of a modification of the control program shown in FIG. 7.

Illustrated in FIG. 9 is a modification of the control program shown in FIG. 7, wherein processing at step 230 is added to determine whether the relative vertical movement velocity y' calculated by processing at step 208 is in a range between predetermined positive and negative values y1' and y2' or not. In this modification, if the relative vertical movement velocity y' is larger than the predetermined positive value y1' or smaller than the predetermined negative value y2', the computer 23 determines a "yes" answer at step 230 and adjusts the lower limit value $C_{LIM}$ to the larger value C1 than the predetermined small value Cmin. If the relative vertical movement velocity y' is less than the predetermined positive value y1' and more than the predetermined negative value y2', the computer 23 determines a "No" answer at step 230 and sets the lower limit value $C_{LIM}$ to the predetermined small value Cmin.

With such adjustment of the lower limit value $C_{LIM}$ as described above, even when the damper device 15 is expanded to increase the relative vertical displacement amount y more than the predetermined positive value y1 or contracted to decrease the relative vertical displacement amount y less than the predetermined negative value y2, the lower limit value $C_{LIM}$ is set to the predetermined small value Cmin in a condition where the absolute value of the relative vertical movement velocity y' of the vehicle body structure to the lower arm member 13 is small. As a result, the damping coefficient of damper device 15 is controlled on a basis of the Skyhook theory to enhance riding comfort of the vehicle. If the absolute value of the relative vertical movement velocity y' becomes large, the lower limit value $C_{LIM}$ is adjusted to the larger value C1 than the predetermined small value Cmin to avoid the rebound stopper 15f from abutment against the internal upper end of cylinder tube 15a and to avoid the bound stopper 11a from abutment against the head portion of cylinder tube 15a.

Figure 10:
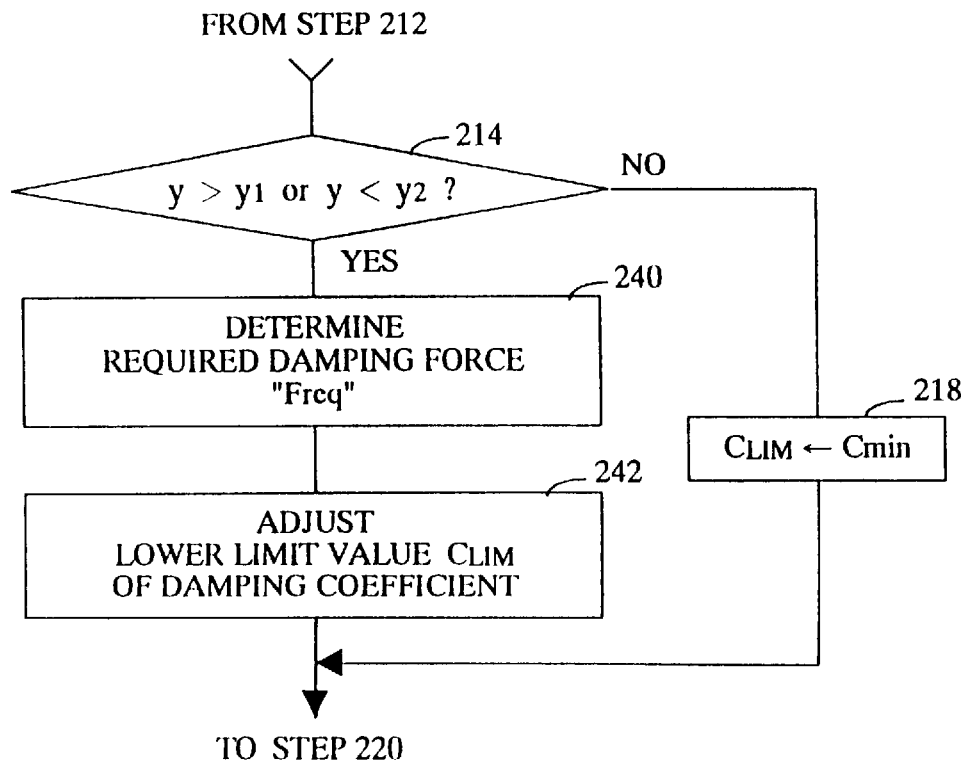
FIG. 10 is a flow chart of another modification of the control program shown in FIG. 7.
Figure 11:
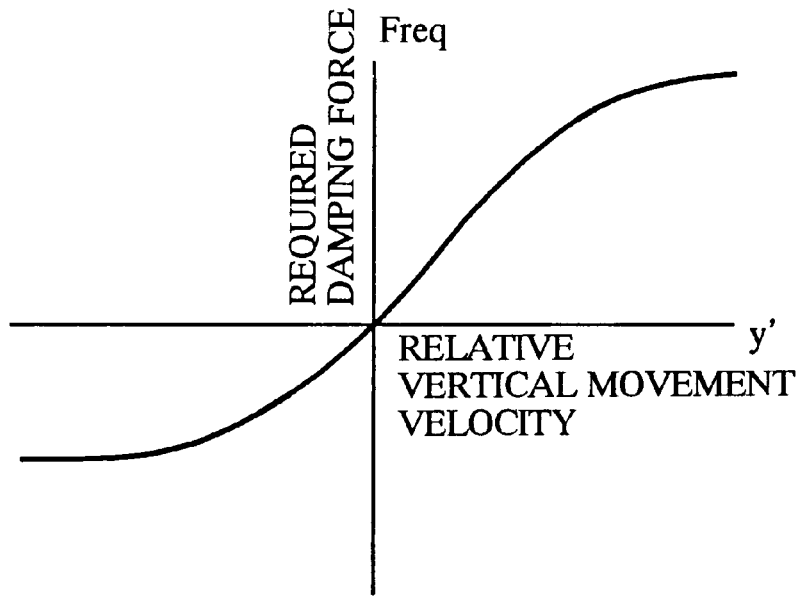
FIG. 11 is a graph showing a required damping force Freq in relation to a relative vertical movement velocity utilized for execution of the control program shown in FIG. 10.
Figure 12:
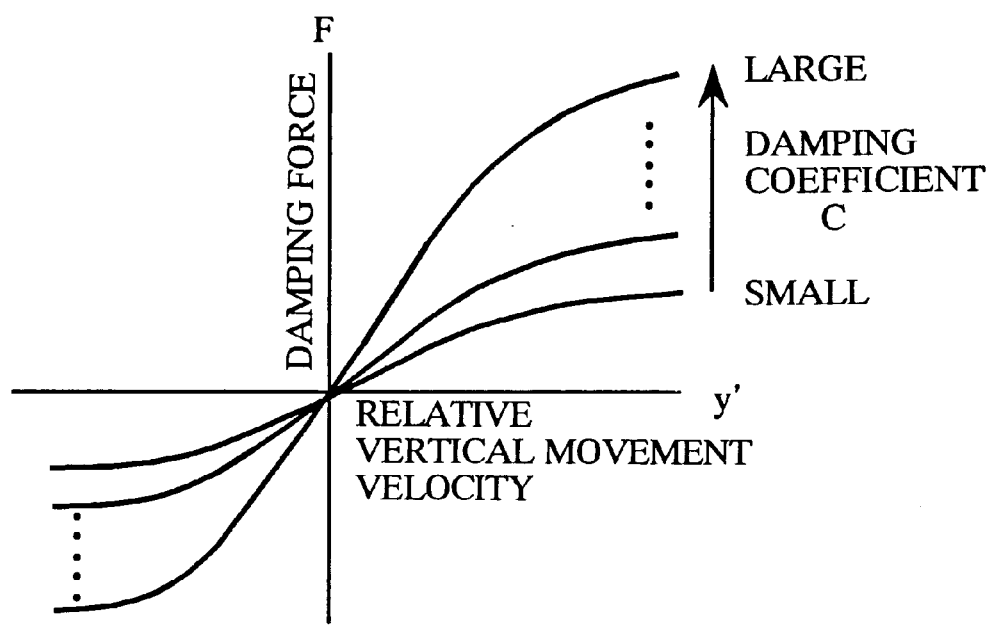
FIG. 12 is a graph showing each damping coefficient representing a characteristic of a damper device in relation to a damping force F and a relative vertical movement velocity.

Illustrated in FIG. 10 is another modification of the control program shown in FIG. 7, wherein the processing at step 216 is replaced with processing at step 240 and 242. In this modification, the computer 23 determines at step 240 a required damping force Freq in accordance with the relative vertical movement velocity y' calculated by processing at step 208 with reference to a required damping force table shown in FIG. 11. The required damping fore table is stored in the computer 23 to increase the absolute value of the required damping force Freq in accordance with an increase of the absolute value of the relative vertical movement velocity y' when the relative vertical displacement amount y increases more than the predetermined positive value y1 or decreases less than the predetermined negative value y2. At the following step 242, the computer 23 determines a damping coefficient corresponding with the relative vertical movement velocity y' and required damping force Freq as the lower limit value $C_{LIM}$ with reference to a damping force characteristic table shown in FIG. 12. The damping force characteristic table is stored in the computer 23 to determine each damping coefficient of the damper device 15 in relation to the relative vertical movement velocity y' and the required damping force Freq.

In such adjustment of the lower limit value $C_{LIM}$ as described above, when the damper device 15 is expanded to increase the relative vertical displacement amount y more than the predetermined positive value y1 or contracted to decrease the relative vertical displacement amount y less than the predetermined negative value y2, the lower limit value $C_{LIM}$ is determined in accordance with the relative vertical velocity y'. That is to say the lower limit value $C_{LIM}$ is adjusted to a small value when the absolute value of the relative vertical movement velocity y' becomes small and is adjusted to a large value when the absolute value of the relative vertical movement velocity y' becomes large. (See the lower limit value $C_{LIM}$ shown by broken lines in FIG. 8) Thus, the lower limit value $C_{LIM}$ is adapted to adjust the lower limit value of the target damping coefficient C* for adjustment of the damping coefficient of damper device 15. Accordingly, the lower limit value $C_{LIM}$ can be determined as small as possible in a condition where the rebound stopper 15f may not be brought into abutment against the internal upper end of cylinder tube 15a and where the bound stopper 11a may not be brought into abutment against the head portion of cylinder tube 15a. As a result, even when the absolute value of the relative vertical displacement amount y becomes large, the damping coefficient of damper device 15 can be controlled substantially on a basis of the Skyhook theory to restrain vertical vibration of the vehicle body structure without causing abutment of the rebound stopper 15f or bound stopper 11a against the cylinder tube 15a.

Although in the embodiments and modifications described above, the absolute vertical movement velocity x' of the vehicle body structure and the relative vertical movement velocity of the vehicle body structure to the road wheel 12 are detected to control the damping coefficient of the damper device 15 on a basis of the Skyhook theory, only the absolute vertical movement velocity may be detected to control the damping coefficient of the damper device on a basis of the Skyhook theory. In such a case, the damper device 15 is replaced with a damper device the damping coefficient of which is independently controlled at an expansion side and a contraction side thereof.

For control of the damping coefficient of the damper device 15, the control program shown in FIG. 2 is adapted to calculate the absolute vertical movement velocity x' and the magnitude of vertical vibration of the vehicle body structure by processing at step 102, 104, 110 and 112 the same manner as in the first embodiment. When the magnitude of vertical vibration of the vehicle body structure is smaller than a reference value, the damper device is controlled in the following manner. If the absolute vertical movement velocity x' of the vehicle body structure is "0", the damper device Is set in a first condition where the damping coefficient of the damper device is maintained in a predetermined small value. If the absolute vertical movement velocity x' represents an upward velocity, the damper device is set in a second condition where the damping coefficient at the contraction side is adjusted to a first predetermined value while the damping coefficient at the expansion side is increased in accordance with an increase of the absolute vertical movement velocity x'. If the absolute vertical movement velocity x' represents a downward velocity the damper device is set in a third condition where the damping coefficient at the expansion side is adjusted to a predetermined third value while the damping coefficient at the contraction side is increased in accordance with an increase of the absolute vertical movement velocity. As a result, the damping coefficient of the damper device is adjusted to the predetermined small value (the predetermined first or third value) when vertical vibration of the vehicle body structure tends to be increased and is adjusted to a larger value than the predetermined small value in accordance with an increase of the absolute vertical movement velocity x' when vertical vibration of the vehicle body structure tends to be dampened.

When the magnitude of vertical vibration of the vehicle body structure becomes larger than the reference value during adjustment of the damping coefficient, the computer 23 determines the movement direction of the vehicle body structure. If the absolute vertical movement velocity represents an upward velocity, the damper device is set in the second condition where the damping coefficient at the contraction side is adjusted to the predetermined second value while the damping coefficient at the expansion side is adjusted to a larger value than the predetermined second value. If the absolute vertical movement velocity represents a downward velocity, the damper device is set in the third condition where the damping coefficient at the expansion side is set to the predetermined fourth value while the damping coefficient at the contraction side is adjusted to a larger value than the predetermined fourth value. As a result, when the magnitude of vertical vibration of the vehicle body structure becomes large, the lower limit value of the damping coefficient of the damper device is adjusted to the predetermined second or fourth value even if vibration of the vehicle body structure tends to be increased or decreased.

In such control of the damping coefficient of the damper device as described above, the damping coefficient at the contraction side in the second condition may be adjusted to plural values more than the predetermined first value, and the damping coefficient at the expansion side in the third condition may be adjusted to plural values more than the predetermined third value. Thus, when the magnitude X of vertical vibration of the vehicle body structure becomes large, the lower limit value of the damping coefficient at the contraction side and expansion side is increased in accordance with an increase of the magnitude of vertical vibration.

What is claimed is:

1. A damping coefficient control apparatus for a damper device in a suspension mechanism disposed between a sprung mass and an unsprung mass of a wheeled vehicle, comprising first detection means for detecting an absolute vertical movement velocity of the sprung mass in an absolute space and control means for adjusting a damping coefficient of said damper device to a predetermined small value when vertical vibration of the sprung mass tends to be increased and for increasing the damping coefficient of said damper device more than the predetermined small value in accordance with an increase of the absolute vertical movement velocity detected by said first detection means when vertical vibration of the sprung mass tends to be dampened, wherein the damping coefficient control apparatus further comprises second detection means for detecting a magnitude of vertical vibration of the sprung mass and adjustment means for adjusting a lower limit value of the damping coefficient of the damper device to a larger value than the predetermined small value when the magnitude of vertical vibration of the sprung mass detected by said second detection means increases.

2. A damping coefficient control apparatus for a damper device in a suspension mechanism disposed between a sprung mass and an unsprung mass of a wheezed vehicle, comprising first detection means for detecting an absolute vertical movement velocity of the sprung mass in an absolute space, second detection means for detecting a relative vertical movement velocity of the sprung mass to the unsprung mass, means for determining a target damping coefficient in a predetermined small value when the absolute vertical movement velocity and relative vertical movement velocity are different in their movement directions and for increasing the target damping coefficient in accordance with an increase of a velocity ratio of the absolute vertical movement velocity to the relative vertical movement velocity when the absolute vertical movement velocity and relative vertical movement velocity coincide in their movement directions, and control means for controlling the damping coefficient of said damper device to the target damping coefficient, wherein the damping coefficient control apparatus further comprises third detection means for detecting a magnitude of vertical vibration of the sprung mass and adjustment means for adjusting a lower limit value of the target damping coefficient to a larger value than the predetermined small value when the magnitude of vertical vibration of the sprung mass becomes large.

3. A damping coefficient control apparatus for a damper device as claimed in claim 2, wherein said third detection means comprises means for detecting the magnitude of vertical vibration of the sprung mass at a low frequency corresponding with a resonant frequency of the sprung mass.

4. A damping coefficient control apparatus for a damper device in a suspension mechanism disposed between a sprung mass and an unsprung mass of a wheeled vehicle, comprising first detection means for detecting an absolute vertical movement velocity of the sprung mass in an absolute space and control means for adjusting a damping coefficient of said damper device to a predetermined small value when vertical vibration of the sprung mass tends to be increased and for increasing the damping coefficient of said damper device more than the predetermined small value in accordance with an increase of the absolute vertical movement velocity when vertical vibration of the sprung mass tends to be dampened, wherein the damping coefficient control apparatus further comprises second detection means for detecting a relative vertical displacement amount of the sprung mass to the unsprung mass and adjustment means for adjusting a lower limit value of the damping coefficient of said damper device to a larger value than the predetermined small value when the relative vertical displacement amount detected by said second detection means is out of a predetermined range.

5. A damping coefficient control apparatus for a damper device in a suspension mechanism disposed between a sprung mass and an unsprung mass of a wheeled vehicle, comprising first detection means for detecting an absolute vertical movement velocity of the sprung mass in an absolute space, second detection means for detecting a relative vertical movement velocity of the sprung mass to the unsprung mass, means for determining a target damping coefficient in a predetermined small value when the absolute vertical movement velocity and relative vertical movement velocity are different in their movement directions and for increasing the target damping coefficient in accordance with a velocity ratio of the absolute vertical movement velocity to the relative vertical movement velocity when the absolute vertical movement velocity and relative vertical movement velocity coincide in their movement directions, and control means for controlling the damping coefficient of said damper device to the target damping coefficient, wherein the damping coefficient control apparatus further comprises third detection means for detecting a relative vertical displacement amount of the sprung mass to the unsprung mass and adjustment means for adjusting a lower limit value of the target damping coefficient to a larger value than the predetermined small value when the relative vertical displacement amount detected by said third detection means is out of a predetermined range.

6. A damping coefficient control apparatus for a damper device as claimed in claim 5, wherein said adjustment means comprises means for adjusting the target damping coefficient to the larger value than the predetermined small value only when the relative vertical movement velocity detected by said second detection means becomes larger than a predetermined velocity.

7. A damping coefficient control apparatus for a damper device as claimed in claim 5, wherein said adjustment means comprises means for increasing the lower limit value of the target damping coefficient in accordance with an increase of the relative vertical displacement amount detected by said third detection means.

* * * * *

UNITED STATES PATENT AND TRADEMARK OFFICE
CERTIFICATE OF CORRECTION

PATENT NO. : 5,979,885
DATED : 9 November 1999
INVENTOR(S) : Takayuki KATSUDA

It is certified that error appears in the above-identified patent and that said Letters Patent is hereby corrected as shown below:

| Column | Line | |
|---|---|---|
| 6 | 4 | Change "'?No'" to --No--. |
| 7 | 32 | Change "C*" to --C1--. |
| 8 | 63 | Change "fore" to --force--. |
| 9 | 62 | Change "Is" to --is--. |
| 11 | 8 | Change "wheezed" to --wheeled--. |

Signed and Sealed this

Seventeenth Day of April, 2001

Attest:

NICHOLAS P. GODICI

Attesting Officer   Acting Director of the United States Patent and Trademark Office